UNITED STATES PATENT OFFICE.

WALTER K. FREEMAN, OF OSCAWANA, NEW YORK.

PLASTIC COMPOSITION AND METHOD OF MAKING THE SAME.

1,183,446. Specification of Letters Patent. Patented May 16, 1916.

No Drawing. Application filed January 28, 1915. Serial No. 4,870.

*To all whom it may concern:*

Be it known that I, WALTER K. FREEMAN, a citizen of the United States, residing at Oscawana, in the county of Westchester and State of New York, have invented certain new and useful Improvements in Plastic Compositions and Methods of Making the Same; and I do hereby declare the following to be a full, clear, and exact description of the invention, such as will enable others skilled in the art to which it appertains to make and use the same.

This invention relates to the production of a compound for use in making floorings, walls, roofs, partitions, etc. It is produced comparatively cheap, easily laid and cleaned, is fire and water-proof, germ and vermin proof, and sufficiently tough and elastic to preserve its integrity through ordinary strains and stresses to which floors are subjected, and capable at the same time of being drilled or otherwise perforated without fracture. My compound may also be used in making switch-boards and other electrical appliances, as well as making sinks and wash-tubs. It may also be used in making compound lumber, as nails and screws, when the components are used in certain proportions, may be easily driven into or through it.

My invention includes process and product.

In carrying the invention into practice, I use sawdust, shavings, pulp, straw, excelsior, or other forms of cellulose in its natural state. I reduce this cellulose to a proper degree of fineness, depending, of course, upon the length of the natural fibers and the use to which I desire to put my product. I then subject the cellulose so prepared, whether freed from resin or not, to a cooking action, or more properly speaking, a hydrolyzing action in water, either with or without alkali, for the purpose of softening or hydrolyzing the outer layers of the cellulose cell or fiber. It is a well known fact that cellulose in all its forms has a remarkable affinity for water, and is easily hydrolyzed, that is, charged with water in excess. This is the condition I wish to attain with the fiber I use. I do not wish to carry the cooking far enough to break down the cell structure as such, but only far enough to soften or to render more or less gelatinous, the outer layer of the fiber. It is well known that the hydrolyzing effect is from without toward the inner layers of the fiber. It is only the outer layers I seek to affect. After the fiber is thus treated, I dry it. In this drying I remove a part of the water of hydrolyzation, though not all of it. I may add to the fiber thus prepared, if it is rich in oils or resin, a small proportion of alkali to saponify such oils or resin. If the fiber is the kind which has no such oil or resin, or from which the oil or resin has been removed, the alkali may be omitted. To the fiber thus prepared, whether treated or not, I add a dry metallic oxid, preferably magnesium oxid, though I may use calcium, strontium, or zinc oxids, or perhaps some others. The whole mass is now thoroughly mixed in a mixing machine, so that the fiber is evenly distributed throughout the mass. The quantity of fiber which I use is dependent upon the use to which the product is to be put. The larger the proportion of fiber, the more porous the mass will be and the better its heat insulating properties. However, the more of the oxid I add the harder and tougher the product will be. The product so prepared I may put into packages, and at the time it is to be used, the compound is laid in place and sprinkled with a solution of a metallic halogen compound of such a nature that it will react with the oxid distributed in the mass. If magnesium oxid has been used, the best thing to use is, of course, magnesium chlorid, whereby a magnesium oxychlorid compound is produced with a filler consisting of the hydrolyzed fiber. I may, instead of adding the chlorid separately, mix the chlorid warm and dry with the oxid and the fiber, and effect the setting whenever and wherever desired simply by the addition of water. If the mixture so made can be maintained free from the access of water, that is, *i. e.* if it can be kept perfectly dry, this is entirely feasible. Unless it can be kept thoroughly dry, however, the chlorid, being hygroscopic, will absorb water, and setting will prematurely occur.

I am well aware that magnesium oxychlorid compounds, of various components and fillers, are well known. I am also well aware that magnesium oxychlorid compounds containing fillers of cork and other cellulosic material, are well known. My present invention differs from those that I have indicated, in that the cellulose which I use has been subjected to the effect of cooking. This cooking and the consequent hydrolyzation affects the character of the cellulose and seems to render it, during the setting action, capable of being, very intimately united with the cement produced by the reaction of the chlorid on the oxid. I ascribe this to the penetrating character of the chlorid solution employed, and to the fact that the cooking of the cellulose fiber appears to have destroyed, in some degree at least, or nullified the osmotic characteristic which cellulose fibers sometimes exhibit. That is, the said fibers not only take up the water which they find in the mixture after the setting has begun, but they also, to some extent appear to absorb the chlorid carried by the water, and hence the reaction with the oxid is carried past the outer walls or skin of the cell, and more or less into the interior. I do not advance this hypothesis as an absolute fact, though I believe it to be correct. I know that the product is of a superior character.

I may, of course, use in addition to the cellulose other filling materials such as those usually employed, namely cork or saw-dust, or fillers of a mineral nature, such as sand or broken brick or stone, or other material of like nature. I may also supplement the compound by the addition of other matters of a cementitious character, such as albumen to be hardened by heat or steam, gelatin to be hardened by chromate of potash or formaldehyde, or if desired, saponifying agents like resin and quicklime.

The chlorid should be supplied in quantity just sufficient to effect the reaction with the oxid. The error, if any, should be on the side of too little rather than too much. How much this may be depends, of course, upon the nature of the materials employed. How much water is to be added depends upon the quantity of fillers added. Thus, when much filling material is added, more water in proportion is required, because all the filling material must be wetted.

In using my material I employ any of the ordinary means. For instance, if the compound is to be used for a floor, I apply it with a trowel; if articles are to be molded, a mold is filled with the compound and the setting effected after filling, by preference.

What I claim as new and desire to secure by Letters Patent of the United States, is:

1. A dry powder comprising fibrous cellulose which has been cooked to effect partial hydrolyzation, a metallic oxid, and a halogen compound of a metal capable of reacting with said oxid and capable of being taken up by the hydrolyzed cellulose.

2. A composition of matter comprising fibrous cellulose, which has been subjected to a hydrolyzing process, and magnesium oxid, thoroughly mixed, said mixture adapted, when treated with a solution of magnesium chlorid, to set.

3. A dry composition of matter comprising hydrolyzed cellulose fiber, and an oxid of such a nature as to be capable of reacting with a halogen compound absorbable by the hydrolyzed fiber, to set.

4. The process which consists in comminuting natural cellulose, treating it with water to partially hydrolyze it and render it capable of intimate union with magnesium chlorid, drying it and mixing it with magnesium oxid.

5. The process which consists in treating natural cellulose fiber with water and an alkali, until the fiber becomes partially hydrolyzed, drying said fiber, mixing said dried fiber with dry magnesium oxid, and finally adding magnesium chlorid in solution whereby the mixture becomes set with the cementitious components absorbed in adherent relation to the hydrolyzed fiber.

In testimony whereof, I affix my signature, in the presence of two witnesses.

WALTER K. FREEMAN.

Witnesses:
ROSE JANDORF,
CLAUS C. STAUFFER.